(12) United States Patent
Hong

(10) Patent No.: US 11,627,615 B2
(45) Date of Patent: Apr. 11, 2023

(54) UAV INDICATION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 146 days.

(21) Appl. No.: 16/967,991

(22) PCT Filed: Feb. 8, 2018

(86) PCT No.: PCT/CN2018/075848
§ 371 (c)(1),
(2) Date: Aug. 6, 2020

(87) PCT Pub. No.: WO2019/153197
PCT Pub. Date: Aug. 15, 2019

(65) Prior Publication Data
US 2021/0368557 A1 Nov. 25, 2021

(51) Int. Cl.
*H04W 76/11* (2018.01)
*H04B 7/185* (2006.01)
*H04W 88/18* (2009.01)

(52) U.S. Cl.
CPC ........ *H04W 76/11* (2018.02); *H04B 7/18506* (2013.01); *H04W 88/18* (2013.01)

(58) Field of Classification Search
CPC ............ B64C 2201/141; G08G 5/0069; H04B 7/18506; H04B 7/18502; H04B 7/18504;
(Continued)

(56) References Cited

U.S. PATENT DOCUMENTS 9,537,561 B1 * 1/2017 Kotecha ................. H04W 8/00
9,681,413 B1   6/2017 Zhang
(Continued)

FOREIGN PATENT DOCUMENTS

CN    102905266 A    1/2013
CN    104219731 A    12/2014
(Continued)

OTHER PUBLICATIONS

European Patent Office, Extended European Search Report Issued in Application No. 18905531.2, dated Feb. 11, 2021, Germany, 11 pages.
(Continued)

*Primary Examiner* — Khalid W Shaheed
(74) *Attorney, Agent, or Firm* — Syncoda LLC; Feng Ma

(57) ABSTRACT

An unmanned aerial vehicle (UAV) indication method is applied to a core network device and includes: receiving an access request from a terminal; adding a first Subscriber Profile ID (SPID) value to first signaling in response to determining that the terminal is a UAV according to the access request, where the first SPID value characterizes a UAV identity of the terminal; and transmitting the first signaling to a base station, such that the base station determines that the terminal is the UAV according to the first SPID value included in the first signaling and provides the terminal with a dedicated UAV service. Thus, the core network device informs the base station whether the terminal is a UAV through the first signaling, thereby saving signaling overheads and improving efficiency of providing the UAV service.

13 Claims, 9 Drawing Sheets

(58) Field of Classification Search
CPC .... H04B 7/18508; H04W 16/18; H04W 4/02; H04W 84/18

See application file for complete search history.

(56) References Cited

U.S. PATENT DOCUMENTS

| | | | |
|---|---|---|---|
| 2008/0085048 | A1 | 4/2008 | Venetsky et al. |
| 2016/0344872 | A1 | 11/2016 | Mathison et al. |
| 2017/0057365 | A1 | 3/2017 | Cho et al. |
| 2017/0308085 | A1* | 10/2017 | Hall .................... G08G 5/0013 |
| 2017/0374694 | A1 | 12/2017 | Kotecha et al. |
| 2018/0014162 | A1* | 1/2018 | Zavesky ................ H04W 4/40 |
| 2018/0035306 | A1* | 2/2018 | Zavesky ............ H04B 7/18506 |

FOREIGN PATENT DOCUMENTS

| | | |
|---|---|---|
| CN | 105144764 A | 12/2015 |
| CN | 105225540 A | 1/2016 |
| CN | 105636042 A | 6/2016 |
| CN | 106385696 A | 2/2017 |
| CN | 107330773 A | 11/2017 |
| GB | 2542474 A | 3/2017 |
| WO | 2016049819 A1 | 4/2016 |

OTHER PUBLICATIONS

ISA State Intellectual Property Office of the People's Republic of China, Written Opinion of the International Searching Authority Issued in Application No. PCT/CN2018/075848, dated Sep. 28, 2018, WIPO, 11 pages.

Qualcomm Incorporated,"Identification of Aerial Vehicles",3GPP TSG-RAN WG2 Meeting #98,Hangzhou, China, R2-1704156, May 15-19, 2017, 5 pages.

LG Electronics Inc.,"Aerial UE Identification",3GPP TSG-RAN WG2 Meeting #98,Hangzhou, China, R2-1705659, May 15-19, 2017, 2 pages.

Liaison Statement,"Liaison Statement on defining a common value for SPID for Unmanned Aircraft",SA WG2 Meeting #S2-124,Reno, Nevada, USA, S2-178308, Nov. 27-Dec. 1, 2017, 3 pages.

Indian Patent Office, Office Action Issued in Application No. 202047036406, dated Sep. 10, 2021, 6 pages.

ISA State Intellectual Property Office of the People's Republic of China, International Search Report Issued in Application No. PCT/CN2018/075848, dated Sep. 28, 2018, WIPO, 6 pages.

State Intellectual Property Office of the People's Republic of China, Office Action and Search Report Issued in Application No. 201880000148.1, dated Dec. 29, 2021, 24 pages. (Submitted with Machine/Partial Translation).

State Intellectual Property Office of the People's Republic of China, Office Action and Search Report Issued in Application No. 201880000148.1, dated May 30, 2022, 15 pages. (Submitted with Machine/Partial Translation).

Li Yuan, "The Research of Search System Based on a Short Range Wireless Communication Technology on UAV", Information Technology Section, Dec. 15, 2013, 75 pages. (Submitted with Partial Translation).

\* cited by examiner

UAV INDICATION METHOD AND APPARATUS

CROSS-REFERENCE TO RELATED APPLICATION

This application is a national stage of International Application No. PCT/CN2018/075848 filed on Feb. 8, 2018, the disclosure of which is hereby incorporated by reference in its entirety.

TECHNICAL FIELD

The present disclosure relates to the field of communication, and in particular, to a UAV indication method and apparatus.

BACKGROUND

An Unmanned Aerial Vehicle (UAV) is an aerial vehicle operated by a radio remote control device and a self-provided program control apparatus without a crew.

With the continuous development of UAV technology, the UAV has been widely used. In the related art, in order to further expand an application range of the UAV, a cellular network needs to provide a service satisfying requirements for the UAV.

SUMMARY

To overcome the problem existing in the related art, examples of the present disclosure provide a UAV indication method and apparatus.

According to a first aspect of the examples of the present disclosure, a UAV indication method is provided, the method is applied to a core network device, and includes:
receiving an access request from a terminal;
adding a first SPID value to first signaling in response to determining that the terminal is a UAV according to the access request, where the first SPID value characterizes a UAV identity of the terminal; and
transmitting the first signaling to a base station, such that the base station determines that the terminal is the UAV according to the first SPID value included in the first signaling and provides the terminal with a dedicated UAV service.

In an example, the method further includes:
configuring the first SPID value, where the first SPID value specifically indicates the UAV identity of the terminal.

In an example, the access request includes an IMEI for determining that the terminal is the UAV.

In an example, the first signaling refers to initial context setup request signaling.

In an example, the method further includes:
generating second signaling in response to determining that the terminal is not the UAV according to the access request, where the second signaling does not include the first SPID value; and
transmitting the second signaling to the base station, such that the base station determines that the terminal is not the UAV according to the first SPID value not included in the second signaling and adopts a common Long-Term Evolution (LTE) network service for the terminal.

In an example, the second signaling includes a second SPID value, the second SPID value characterizes an RRM strategy adopted for the terminal, and the second SPID value is different from the first SPID value.

According to a second aspect of the examples of the present disclosure, a UAV indication method is provided, the method is applied to a base station, and includes:
receiving first signaling from a core network device, where the first signaling includes a first SPID value for characterizing a UAV identity of a terminal transmitted an access request;
determining that the terminal is a UAV according to the first SPID value included in the first signaling; and
providing the terminal with a dedicated UAV service.

In an example, the first signaling refers to initial context setup request signaling.

In an example, the method further includes:
receiving second signaling from the core network device, where the second signaling does not include the first SPID value;
determining that the terminal is not the UAV according to the first SPID value not included in the second signaling; and
providing the terminal with a common LTE network service.

In an example, the second signaling includes a second SPID value, the second SPID value characterizes an RRM strategy adopted for the terminal, and the second SPID value is different from the first SPID value; and
adopting the RRM strategy corresponding to the second SPID value for the terminal.

According to a third aspect of the examples of the present disclosure, a UAV indication apparatus is provided, the apparatus is applied to a core network device, and includes:
a receiving module configured to receive an access request from a terminal;
an adding module configured to add a first SPID value to first signaling in response to determining that the terminal is a UAV according to the access request, where the first SPID value characterizes a UAV identity of the terminal; and
a first transmitting module configured to transmit the first signaling to a base station, such that the base station determines that the terminal is the UAV according to the first SPID value included in the first signaling and provides the terminal with a dedicated UAV service.

In an example, the apparatus further includes:
a configuring module configured to configure the first SPID value, where the first SPID value specifically indicates the UAV identity of the terminal.

In an example, the access request includes an IMEI for determining that the terminal is the UAV.

In an example, the first signaling refers to initial context setup request signaling.

In an example, the apparatus further includes:
a generating module configured to second signaling in response to determining that the terminal is not the UAV according to the access request, where the second signaling does not include the first SPID value; and
a second transmitting module configured to transmit the second signaling to the base station, such that the base station determines that the terminal is not the UAV according to the first SPID value not included in the second signaling and adopts a common LTE network service for the terminal.

In an example, the second signaling includes a second SPID value, the second SPID value characterizes an RRM strategy adopted for the terminal, and the second SPID value is different from the first SPID value.

According to a fourth aspect of the examples of the present disclosure, a UAV indication apparatus is provided, the apparatus is applied to a base station, and includes:

a first receiving module configured to receive first signaling from a core network device, where the first signaling includes a first SPID value for characterizing a UAV identity of a terminal transmitted an access request;

a first determining module configured to determine that the terminal is a UAV according to the first SPID value included in the first signaling; and a first providing module configured to provide the terminal with a dedicated UAV service.

In an example, the first signaling refers to initial context setup request signaling.

In an example, the apparatus further includes:

a second receiving module configured to receive second signaling from the core network device, where the second signaling does not include the first SPID value;

a second determining module configured to determine that the terminal is not the UAV according to the first SPID value not included in the second signaling; and a second providing module configured to provide the terminal with a common LTE network service.

In an example, the second signaling includes a second SPID value, the second SPID value characterizes an RRM strategy adopted for the terminal, and the second SPID value is different from the first SPID value; and the second providing module includes:

a providing sub-module configured to adopt the RRM strategy corresponding to the second SPID value for the terminal.

According to a fifth aspect of the examples of the present disclosure, a non-transitory computer-readable storage medium storing a computer program is provided, and the computer program is to execute the UAV indication method of the first aspect described above.

According to a sixth aspect of the examples of the present disclosure, a non-transitory computer-readable storage medium storing a computer program is provided, and the computer program is to execute the UAV indication method of the second aspect described above.

According to a seventh aspect of the examples of the present disclosure, a UAV indication apparatus is provided, the apparatus is applied to a core network device, and includes:

a processor; and a memory storing instructions executable by the processor, where the processor is configured to:

receive an access request from a terminal;

add a first SPID value to first signaling in response to determining that the terminal is a UAV according to the access request, where the first SPID value characterizes a UAV identity of the terminal; and transmit the first signaling to a base station, such that the base station determines that the terminal is the UAV according to the first SPID value included in the first signaling and provides the terminal with a dedicated UAV service.

According to an eighth aspect of the examples of the present disclosure, a UAV indication apparatus is provided, the apparatus is applied to a base station, and includes:

a processor; and a memory storing instructions executable by the processor, where the processor is configured to:

receive first signaling from a core network device, where the first signaling includes a first SPID value for characterizing a UAV identity of a terminal transmitted an access request;

determine that the terminal is a UAV according to the first SPID value included in the first signaling; and provide the terminal with a dedicated UAV service.

The technical solutions provided by the examples of the present disclosure may include the following beneficial effect.

In the examples of the present disclosure, when receiving the access request from the terminal and determining that the terminal is a UAV according to the access request from the terminal, the core network device may add the first SPID value which characterizes the UAV identity of the terminal to the first signaling, and transmit the first signaling to the base station, such that the base station can determine that the terminal transmitted the access request is the UAV according to the first SPID value included in the first signaling and provide the terminal with the dedicated UAV service. In this way, the core network device informs the base station whether the terminal is a UAV through the first signaling, thereby saving signaling overheads and improving efficiency of providing the UAV service.

In the examples of the present disclosure, upon receiving the first signaling including the first SPID value from the core network device, the base station may determine that the terminal transmitted the access request is the UAV according to the first SPID value included in the first signaling, and provide the terminal with the dedicated UAV service. Therefore, the core network device informs the base station whether the terminal is a UAV through the first signaling, signaling overheads are saved, and efficiency of providing the UAV service is improved.

It should be understood that the above general description and the following detailed description are only exemplary and explanatory, and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
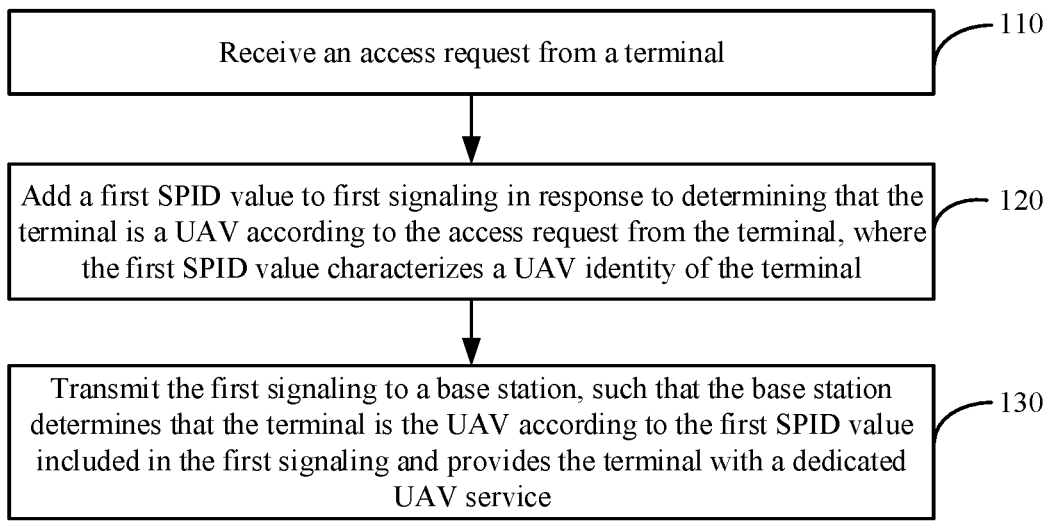
FIG. 1 is a flowchart illustrating a UAV indication method according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first", "second", "third", and the like may be used in the present disclosure to describe various information, such information should not be limited to these terms. These terms are only used to distinguish one category of information from another. For example, without departing from the scope of the present disclosure, first information may be referred to as second information; and similarly, the second information may also be referred to as the first information. Depending on the context, the word "if" as used herein may be interpreted as "when" or "upon" or "in response to determining".

An Unmanned Aerial Vehicle (UAV) is an aerial vehicle operated by a radio remote control device and a self-provided program control apparatus without a crew.

With the continuous development of UAV technology, the UAV has been widely used. In the related art, in order to further expand an application range of the UAV, a cellular network needs to provide a service satisfying requirements for the UAV. However, how to let a base station know that the identity of a terminal connected to a network of the base station is a UAV through a core network and provide the terminal with a dedicated UAV service is a key issue.

In view of the above issue, the present disclosure provides a UAV indication method, in which, after receiving an access request from a terminal, the core network device may add a first SPID (Subscriber Profile ID) value for characterizing a UAV identity of the terminal to first signaling (for example, the first signaling refers to existing initial context setup request signaling) in response to determining that the terminal is a UAV according to the access request from the terminal, and transmit the first signaling to the base station, such that the base station may determine that the terminal is the UAV according to the first SPID value and provide the terminal with a dedicated UAV service. The core network device may generate second signaling (for example, the second signaling refers to the initial context setup request signaling), which does not include the first SPID value for characterizing a UAV identity of the terminal in response to determining that the terminal is not the UAV according to the access request from the terminal, and transmit the second signaling to the base station, such that the base station may determine that the terminal is not the UAV according to the first SPID value being not included in the second signaling and provide the terminal with a common long-term evolution (LTE) network service. In this way, the core network device informs the base station whether the terminal is the UAV through the existing signaling, thereby saving the signaling overheads.

Hereinafter, the technical solutions provided by the embodiments of the present disclosure will be described in the detailed examples.

Figure 2:
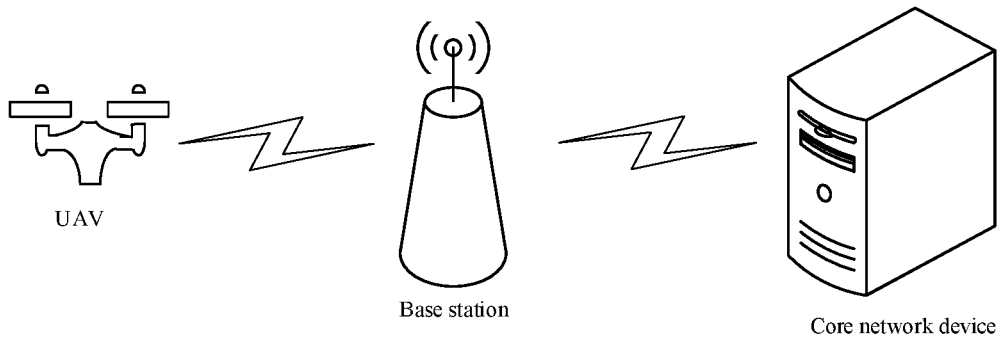
FIG. 2 is an application scenario diagram illustrating a UAV indication method according to an example.

FIG. 1 is a flowchart illustrating a UAV indication method according to an example, and FIG. 2 is an application scenario diagram illustrating a UAV indication method according to an example. The UAV indication method may be applied in a core network device. For example, the core network device may be a Mobility Management Entity (MME), and which is for signaling management, tracking area management, gateway selection, and the like. As shown in FIG. 1, the UAV indication method may include the following steps 110-130.

At step 110, an access request from a terminal is received.

In the examples of the present disclosure, the terminal transmitted the access request may be a UAV, or may not be a UAV. The UAV may be a cellular network UAV, that is, the cellular network UAV can accept a service provided by a cellular network.

At step 120, in response to determining that the terminal is a UAV according to the access request from the terminal, a first SPID value is added to first signaling, where the first SPID value characterizes a UAV identity of the terminal.

In the examples of the present disclosure, the first SPID value is a special SPID value defined by the core network device, which specifically indicates the UAV identity of the terminal.

In an example, the first SPID value is to be configured prior to performing step 120, where the first SPID value specifically indicates the UAV identity of the terminal.

In the examples of the present disclosure, the core network device may configure the first SPID value to a specific value, such as, 223. However, "223" is merely an example value, and the first SPID value may be defined as other values.

In an example, the first signaling may be existing signaling, for example, initial context setup request signaling.

The initial context setup request signaling is generally used to inform the base station of attach acceptance and starting to establish a bearer. In the present disclosure, the initial context setup request signaling may also be used to inform the base station whether the terminal transmitted the access request is the UAV.

In an example, the access request from the terminal may include an IMEI (International Mobile Equipment Identity) for determining that the terminal is the UAV. In this way, when it is determined that the terminal is the UAV according to the access request from the terminal at step 120, the terminal can be determined as the UAV according to the IMEI in the access request.

In the examples of the present disclosure, a new device type for the UAV is defined in GSMA (Global System for Mobile Communications Alliance), and a corresponding TAC (Type Allocation Code) is allocated to the device type of the UAV, thus, an IMEI is generated. Each cellular network UAV is allocated with one IMEI generated as above.

At step 130, the first signaling is transmitted to the base station, such that the base station determines that the terminal transmitted the access request is the UAV according to the first SPID value included in the first signaling and provides the terminal with a dedicated UAV service.

In an exemplary scenario as shown in FIG. 2, a UAV, a base station and a core network device are included. The UAV transmits an access request to the base station during an access phase. Upon receiving the access request from the UAV, the base station may transparently transmit the access request to the core network device. Upon receiving the access request transparently transmitted by the base station, the core network device may first determine whether the terminal transmitted the access request is a UAV according to the access request (for example, when the access request includes an IMEI specifically allocated for the UAV, the terminal can be directly determined to be the UAV based on the IMEI). If the core network device determines that the terminal is the UAV, a first SPID value for characterizing a UAV identity of the terminal is added to first signaling, and the first signaling is transmitted to the base station, such that the base station may determine that the terminal transmitted the access request is the UAV according to the first signaling and provide the UAV with a dedicated UAV service.

As seen from the above example, when the access request from the terminal is received and the terminal is determined as the UAV according to the access request from the terminal, the first SPID value which characterizes the UAV identity of the terminal can be added to the first signaling, and the first signaling can be transmitted to the base station, such that the base station can determine that the terminal transmitted the access request is the UAV according to the first SPID value included in the first signaling and provide the terminal with the dedicated UAV service. In this way, the core network device informs the base station whether the terminal is a UAV through the first signaling, thereby saving signaling overheads and improving efficiency of providing the UAV service.

Figure 3:
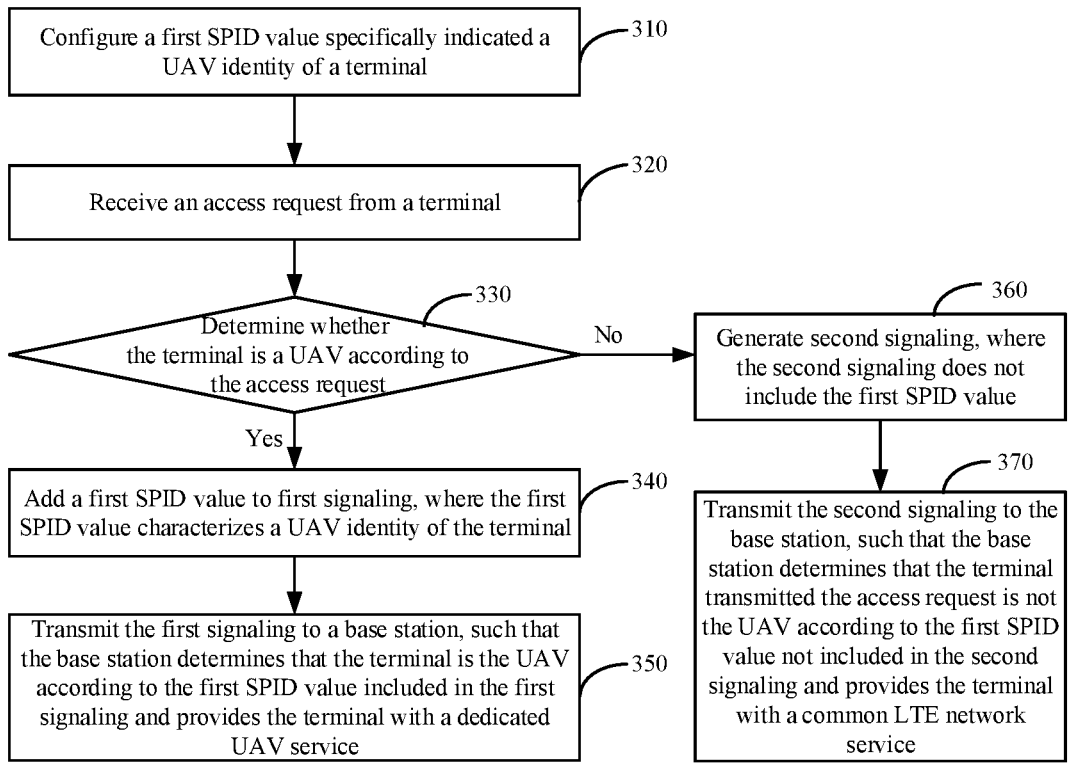
FIG. 3 is a flowchart illustrating another UAV indication method according to an example.

FIG. 3 is a flowchart illustrating another UAV indication method according to an example. On the basis of the method shown in FIG. 1, this UAV indication method may be applied to the core network device. As shown in FIG. 3, the UAV indication method includes the following steps 310-370.

At step 310, a first SPID value specifically indicated a UAV identity of a terminal is configured.

At step 320, an access request from a terminal is received.

At step 330, it is determined whether the terminal is a UAV according to the access request. If determining that the terminal is the UAV, steps 340 and 350 are performed; otherwise, steps 360 and 370 are performed.

At step 340, the first SPID value for characterizing the UAV identity of the terminal is added to first signaling.

At step 350, the first signaling is transmitted to the base station, such that the base station determines that the terminal transmitted the access request is the UAV according to the first SPID value included in the first signaling and provides the terminal with a dedicated UAV service.

In the examples of the present disclosure, the first signaling may be existing signaling, for example, the first signaling may be initial context setup request signaling.

At step 360, second signaling is generated, where the second signaling does not include the first SPID value.

In the examples of the present disclosure, the second signaling may be the same as the first signaling, for example, the first signaling and the second signaling may be the initial context setup request signaling.

The core network device may not add any SPID value in the second signaling in response to determining that the terminal transmitted the access request is not the UAV. Thus, the base station determines that the terminal transmitted the access request is not the UAV according to the first SPID value not included in the second signaling, and provides the terminal with a common LTE network service. In response to determining that the terminal is not the UAV, a second SPID value may also be added to the second signaling, where the second SPID value characterizes an RRM (Radio Resource Management) strategy provided for the terminal, and the second SPID value is different from the first SPID value. Thus, the base station determines that the terminal transmitted the access request is not the UAV according to the first SPID value not included in the second signaling, and determines which RRM strategy in a common LTE network service is provided for the terminal according to the second SPID value.

In an example, the second signaling includes the second SPID value characterized the RRM strategy provided for the terminal, and the second SPID value is different from the first SPID value.

In the examples of the present disclosure, the second SPID value indicates which RRM strategy the base station may adopt for the terminal that transmits the access request. A second SPID value corresponds to a specific RRM strategy, and different second SPID values may correspond to different RRM strategies. Moreover, the same terminal may be assigned different second SPID values, and different terminals may be assigned the same second SPID value.

At step 370, the second signaling is transmitted to the base station, such that the base station determines that the terminal transmitted the access request is not the UAV according to the first SPID value not included in the second signaling and provides the terminal with a common LTE network service.

It can be seen from the above example that, the first signaling including the first SPID value informs the base station that the terminal transmitted the access request is a UAV, or the second signaling not including the first SPID value informs the base station that the terminal transmitted the access request is not a UAV, thereby improving the efficiency and accuracy of UAV indication.

Figure 4:
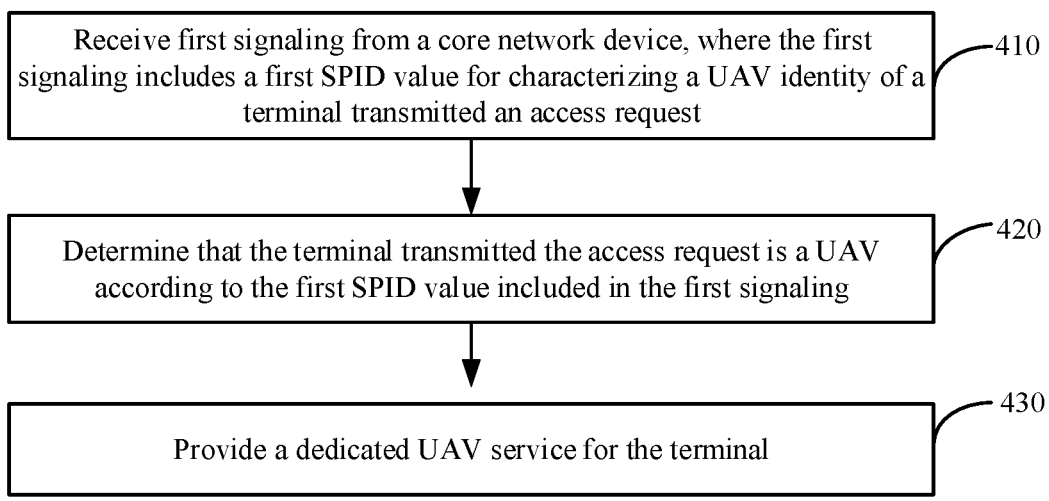
FIG. 4 is a flowchart illustrating a UAV indication method according to an example.

FIG. 4 is a flowchart illustrating a UAV indication method according to an example. The UAV indication method may be applied to a base station. As shown in FIG. 4, the UAV indication method includes the following steps 410-430.

At step 410, first signaling from a core network device is received. The first signaling includes a first SPID value for characterizing a UAV identity of a terminal transmitted an access request.

In the examples of the present disclosure, the first SPID value is a special SPID value defined by the core network device, and the first SPID value specifically indicates the UAV identity of the terminal. The first SPID value may be a specific value, such as, 223.

In an example, the first signaling may be existing signaling, for example, initial context setup request signaling.

The initial context setup request signaling is generally used to inform the base station of attach acceptance and starting to establish a bearer. In the present disclosure, the initial context setup request signaling may also be used to inform the base station whether the terminal transmitted the access request is the UAV.

At step 420, it is determined that the terminal transmitted the access request is a UAV according to the first SPID value included in the first signaling.

At step 430, a dedicated UAV service is provided for the terminal. The dedicated UAV service may include an RRM strategy for the UAV.

In the examples of the present disclosure, when providing the dedicated UAV service for the terminal, a dedicated resource may be provided for the UAV, or a dedicated power control scheme may be adopted for the UAV.

As seen from the above example, upon receiving the first signaling including the first SPID value from the core network device, it can be determined that the terminal transmitted the access request is the UAV according to the first SPID value included in the first signaling, and the dedicated UAV service can be provided for the terminal. Therefore, the core network device informs the base station whether the terminal is a UAV through the first signaling, signaling overheads are saved, and efficiency of providing the UAV service is improved.

Figure 5:
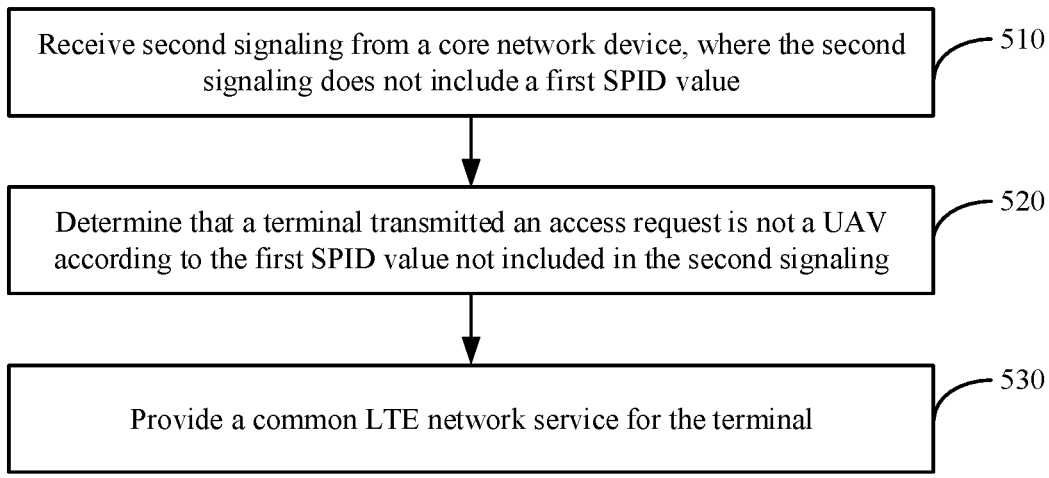
FIG. 5 is a flowchart illustrating another UAV indication method according to an example.

FIG. 5 is a flowchart illustrating another UAV indication method according to an example. The UAV indication method may be applied to the base station and is based on the method shown in FIG. 4. As shown in FIG. 5, the UAV indication method further includes the following steps 510-530.

At step 510, second signaling from a core network device is received, where the second signaling does not include a first SPID value.

In the examples of the present disclosure, the second signaling may be the same as the first signaling, for example, the first signaling and the second signaling may be the initial context setup request signaling.

At step 520, it is determined that a terminal transmitted an access request is not a UAV according to the first SPID value not included in the second signaling.

In the examples of the present disclosure, as long as the second signaling does not include the first SPID value, it can be determined that the terminal transmitted the access request is not the UAV, regardless of whether the second signaling includes other SPID values, such as a second SPID value with respect to an RRM strategy provided for the terminal.

At step 530, a common LTE network service is provided for the terminal.

In the examples of the present disclosure, if determining that the terminal transmitted the access request is not the UAV, the base station determines that the terminal is a common LTE terminal, and then may provide the common LTE terminal with a corresponding common LTE network service.

In an example, if the second signaling includes a second SPID value, where the second SPID value characterizes an RRM strategy adopted for the terminal, and the second SPID value is different from the first SPID value, the RRM strategy corresponding to the second SPID value may be adopted for the terminal when performing step 530.

In the examples of the present disclosure, the second SPID value indicates which RRM strategy the base station may adopt for the terminal that transmits the access request. A second SPID value corresponds to a specific RRM strategy, and different second SPID values may correspond to different RRM strategies. Moreover, the same terminal may be assigned different second SPID values, and different terminals may be assigned the same second SPID value.

As seen from the above example, upon receiving the second signaling from the core network device, where the second signaling does not include the first SPID value, it can be determined that the terminal transmitted the access request is not the UAV according to the first SPID value not included in the second signaling, and the common LTE network service is provided for the terminal, thereby improving efficiency and accuracy of UAV indication.

Figure 6:
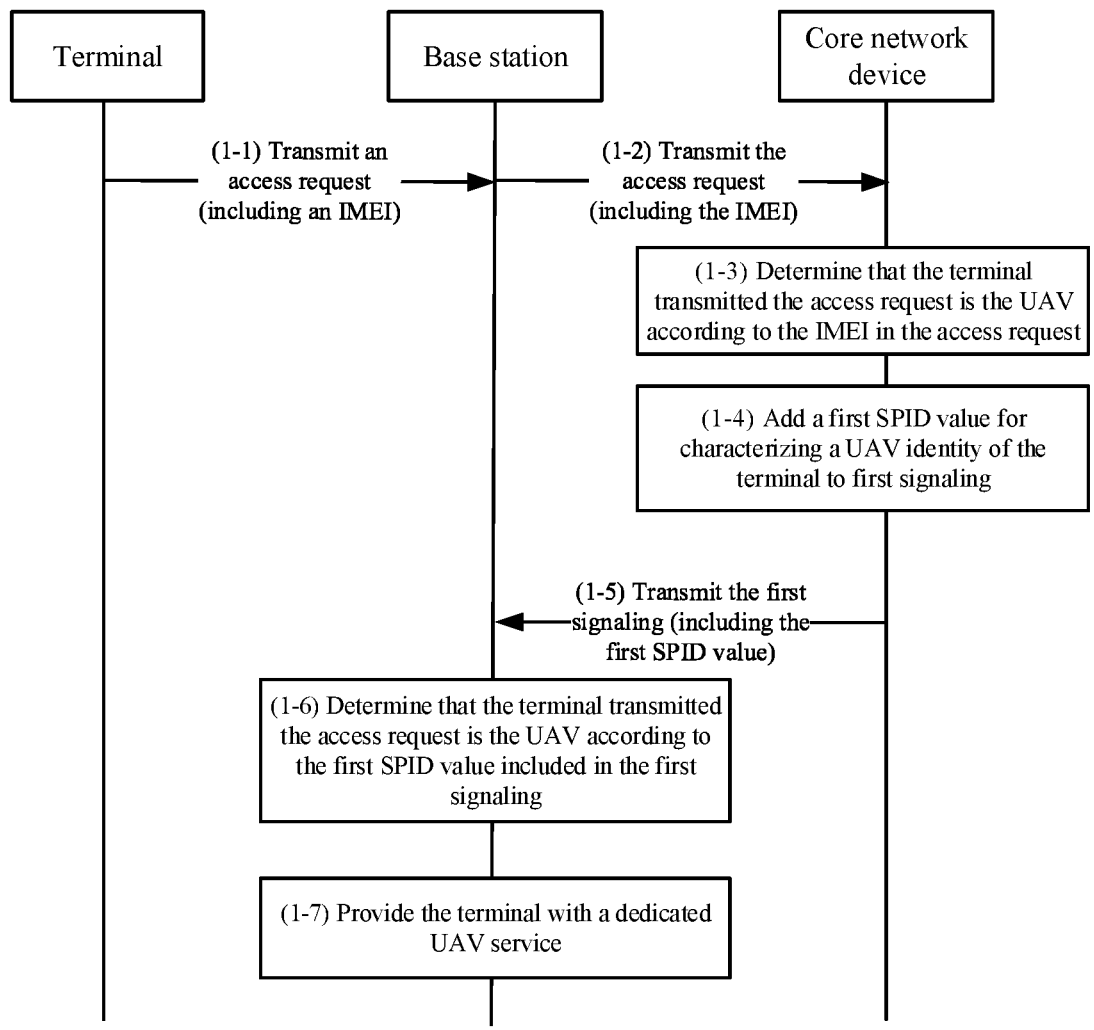
FIG. 6 is an information interaction diagram illustrating a UAV indication method according to an example.

FIG. 6 is an information interaction diagram illustrating a UAV indication method according to an example. As shown in FIG. 6, a terminal, a base station and a core network device are included, and a detail information interaction process among the terminal, the base station and the core network device is as followings.

(1-1) The terminal transmits an access request to the base station. The access request includes an IMEI for determining that the terminal is a UAV.

(1-2) The base station transparently transmits the access request to the core network device.

(1-3) The core network device determines that the terminal transmitted the access request is the UAV according to the IMEI in the access request.

(1-4) The core network device adds a first SPID value for characterizing a UAV identity of the terminal to first signaling.

(1-5) The core network device transmits the first signaling to the base station. The first signaling includes the first SPID value.

(1-6) The base station determines that the terminal transmitted the access request is the UAV according to the first SPID value included in the first signaling.

(1-7) The base station provides the terminal with a dedicated UAV service. The dedicated UAV service may include an RRM strategy for the UAV.

Figure 7:
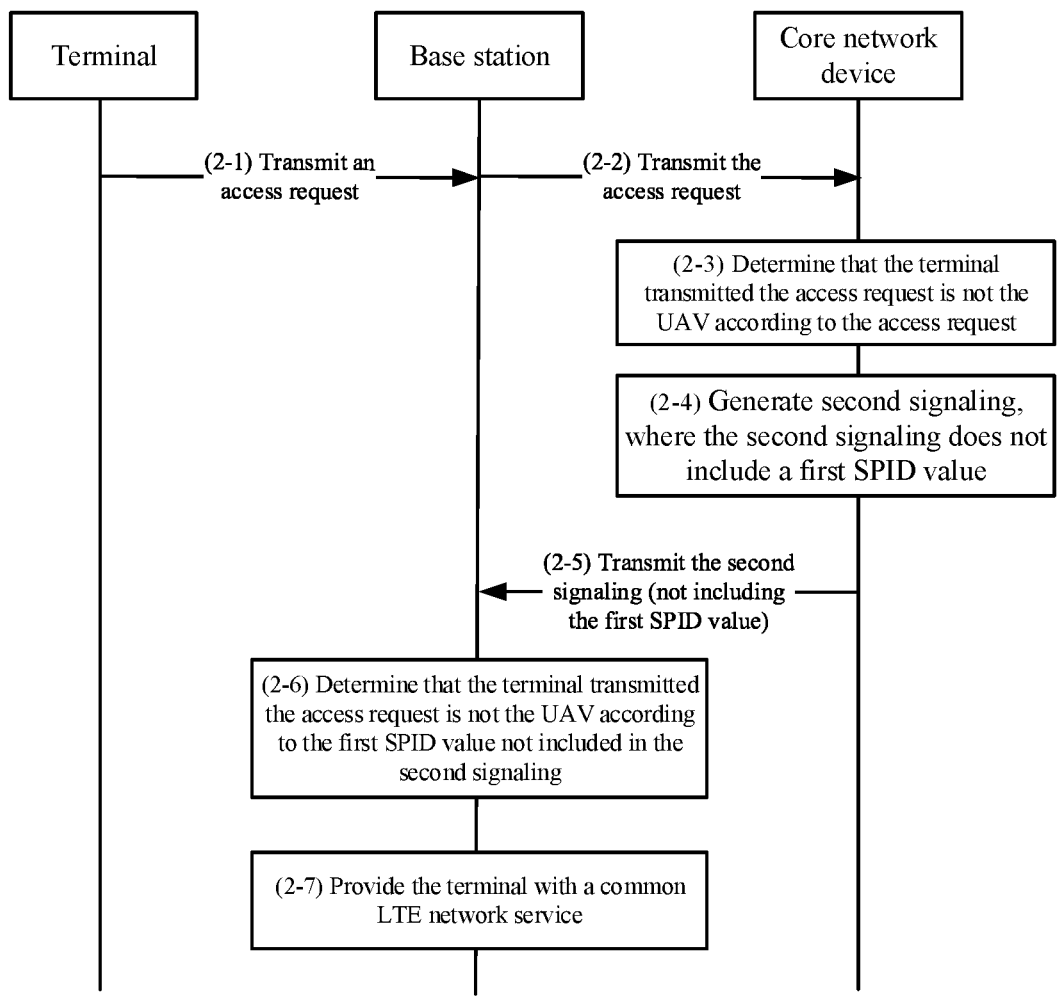
FIG. 7 is an information interaction diagram illustrating another UAV indication method according to an example.

FIG. 7 is an information interaction diagram illustrating another UAV indication method according to an example. As shown in FIG. 7, a terminal, a base station and a core network device are included, and a detail information interaction process among the terminal, the base station and the core network device is as followings.

(2-1) The terminal transmits an access request to the base station.

(2-2) The base station transparently transmits the access request to the core network device.

(2-3) The core network device determines that the terminal transmitted the access request is not a UAV according to the access request.

(2-4) The core network device generates second signaling, where the second signaling does not include a first SPID value.

(2-5) The core network device transmits the second signaling to the base station. The second signaling does not include the first SPID value.

(2-6) The base station determines that the terminal transmitted the access request is not the UAV according to the first SPID value not included in the second signaling.

(2-7) The base station provides a common LTE network service for the terminal.

The present disclosure also provides examples of a UAV indication apparatus corresponding to the foregoing examples of the UAV indication method.

Figure 8:
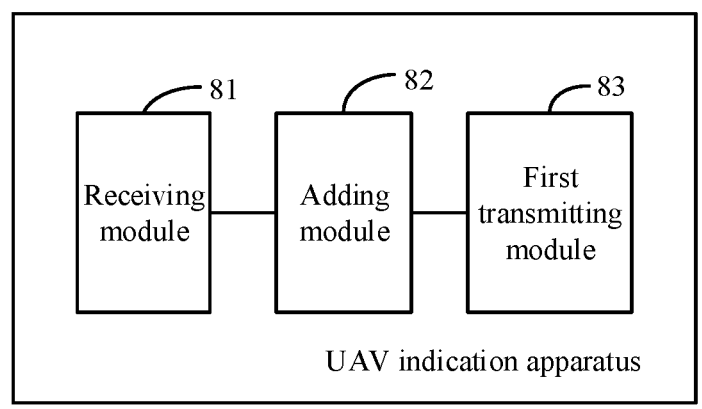
FIG. 8 is a block diagram illustrating a UAV indication apparatus according to an example.

FIG. 8 is a block diagram illustrating a UAV indication apparatus according to an example. The UAV indication apparatus is applied to a core network device and performs the UAV indication method shown in FIG. 1. As shown in FIG. 8, the UAV indication apparatus may include:

a receiving module 81 configured to receive an access request from a terminal;

an adding module 82 configured to add a first SPID value to first signaling in response to determining that the terminal is a UAV according to the access request, where the first SPID value characterizes a UAV identity of the terminal; and a first transmitting module 83 configured to transmit the first signaling to a base station, such that the base station determines that the terminal is the UAV according to the first SPID value included in the first signaling and provides the terminal with a dedicated UAV service.

As seen from the above example, when the access request from the terminal is received and the terminal is determined as the UAV according to the access request from the terminal, the first SPID value which characterizes the UAV identity of the terminal can be added to the first signaling, and the first signaling can be transmitted to the base station, such that the base station can determine that the terminal transmitted the access request is the UAV according to the first SPID value included in the first signaling and provide the terminal with the dedicated UAV service. In this way, the core network device informs the base station whether the terminal is a UAV through the first signaling, thereby saving signaling overheads and improving efficiency of providing the UAV service.

Figure 9:
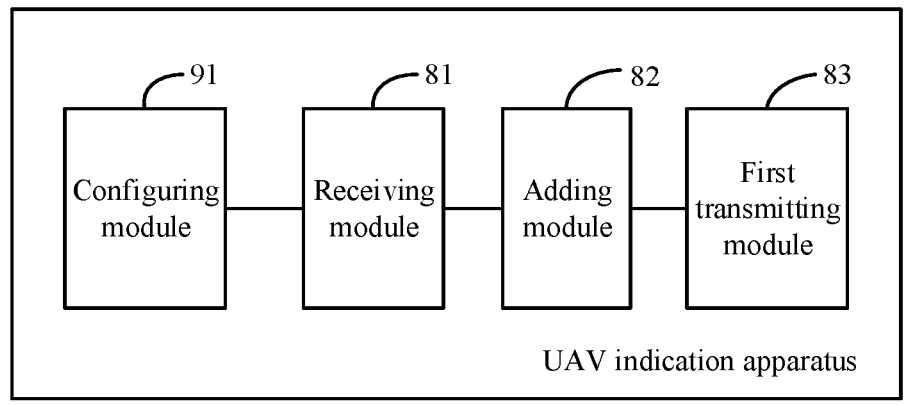
FIG. 9 is a block diagram illustrating another UAV indication apparatus according to an example.

In an example, based on the apparatus shown in FIG. 8 and as shown in FIG. 9, the UAV indication apparatus may further include:

a configuring module 91 configured to configure the first SPID value, where the first SPID value specifically indicates the UAV identity of the terminal.

In an example, based on the apparatus shown in FIG. 8, the access request includes an IMEI for determining that the terminal is the UAV.

In an example, based on the apparatus shown in FIG. 8, the first signaling refers to initial context setup request signaling.

Figure 10:
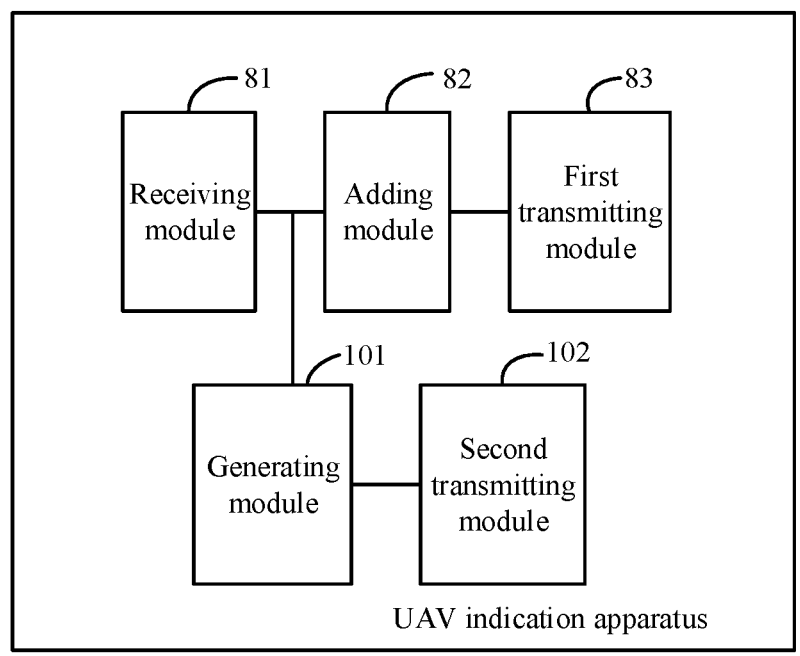
FIG. 10 is a block diagram illustrating another UAV indication apparatus according to an example.

In an example, based on the apparatus shown in FIG. 8 and as shown in FIG. 10, the UAV indication apparatus may further include:

a generating module 101 configured to second signaling in response to determining that the terminal is not the UAV according to the access request, where the second signaling does not include the first SPID value; and a second transmitting module 102 configured to transmit the second signaling to the base station, such that the base station determines that the terminal is not the UAV according to the first SPID value not included in the second signaling and adopts a common LTE network service for the terminal.

In an example, based on the apparatus shown in FIG. 10, the second signaling includes a second SPID value, the second SPID value characterizes an RRM strategy adopted for the terminal, and the second SPID value is different from the first SPID value.

It can be seen from the above example that, the first signaling including the first SPID value informs the base station that the terminal transmitted the access request is a UAV, or the second signaling not including the first SPID value informs the base station that the terminal transmitted the access request is not a UAV, thereby improving the efficiency and accuracy of UAV indication.

Figure 11:
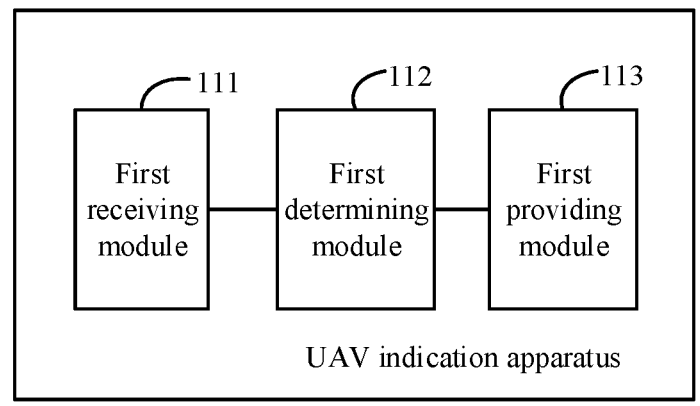
FIG. 11 is a block diagram illustrating a UAV indication apparatus according to an example.

FIG. 11 is a block diagram illustrating a UAV indication apparatus according to an example. The UAV indication apparatus is applied to a base station and performs the UAV indication method shown in FIG. 4. As shown in FIG. 11, the UAV indication apparatus may include:

a first receiving module 111 configured to receive first signaling from a core network device, where the first signaling includes a first SPID value for characterizing a UAV identity of a terminal transmitted an access request;

a first determining module 112 configured to determine that the terminal is a UAV according to the first SPID value included in the first signaling; and a first providing module 113 configured to provide the terminal with a dedicated UAV service.

As seen from the above example, upon receiving the first signaling including the first SPID value from the core network device, it can be determined that the terminal transmitted the access request is the UAV according to the first SPID value included in the first signaling, and the dedicated UAV service can be provided for the terminal. Therefore, the core network device informs the base station whether the terminal is a UAV through the first signaling, signaling overheads are saved, and efficiency of providing the UAV service is improved.

In an example, based on the apparatus shown in FIG. 11, the first signaling refers to initial context setup request signaling.

Figure 12:
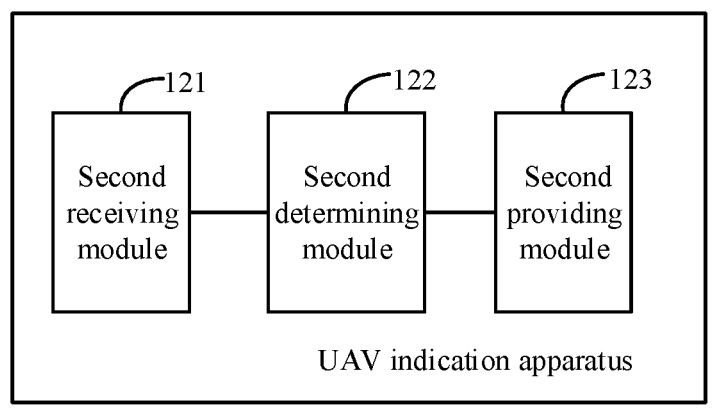
FIG. 12 is a block diagram illustrating another UAV indication apparatus according to an example.

In an example, based on the apparatus shown in FIG. 11 and as shown in FIG. 12, the UAV indication apparatus may further include:

a second receiving module 121 configured to receive second signaling from the core network device, where the second signaling does not include the first SPID value;

a second determining module 122 configured to determine that the terminal is not the UAV according to the first SPID value not included in the second signaling; and a second providing module 123 configured to provide the terminal with a common LTE network service.

Figure 13:
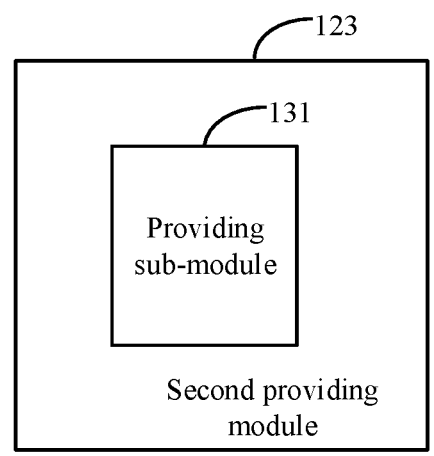
FIG. 13 is a block diagram illustrating a UAV indication apparatus according to an example.

In an example, based on the apparatus shown in FIG. 12 and as shown in FIG. 13, the second providing module 123 may include:

a providing sub-module 131 configured to adopt the RRM strategy corresponding to the second SPID value for the terminal.

As seen from the above example, upon receiving the second signaling from the core network device, where the second signaling does not include the first SPID value, it can be determined that the terminal transmitted the access request is not the UAV according to the first SPID value not included in the second signaling, and the common LTE network service is provided for the terminal, thereby improving efficiency and accuracy of UAV indication.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

Accordingly, the present disclosure also provides a non-transitory computer-readable storage medium storing a computer program, where the computer program is to execute the UAV indication method of any one of FIGS. 1-3 described above.

Accordingly, the present disclosure also provides a non-transitory computer-readable storage medium storing a computer program, where the computer program is to execute the UAV indication method of any one of FIGS. 4 and 5 described above.

Accordingly, the present disclosure also provides a UAV indication apparatus, the apparatus is applied to a core network device, and includes:

a processor; and a memory storing instructions executable by the processor, where the processor is configured to:

receive an access request from a terminal;

add a first SPID value to first signaling in response to determining that the terminal is a UAV according to the access request, where the first SPID value characterizes a UAV identity of the terminal; and transmit the first signaling to a base station, such that the base station determines that the terminal is the UAV according to the first SPID value included in the first signaling and provides the terminal with a dedicated UAV service.

Figure 14:
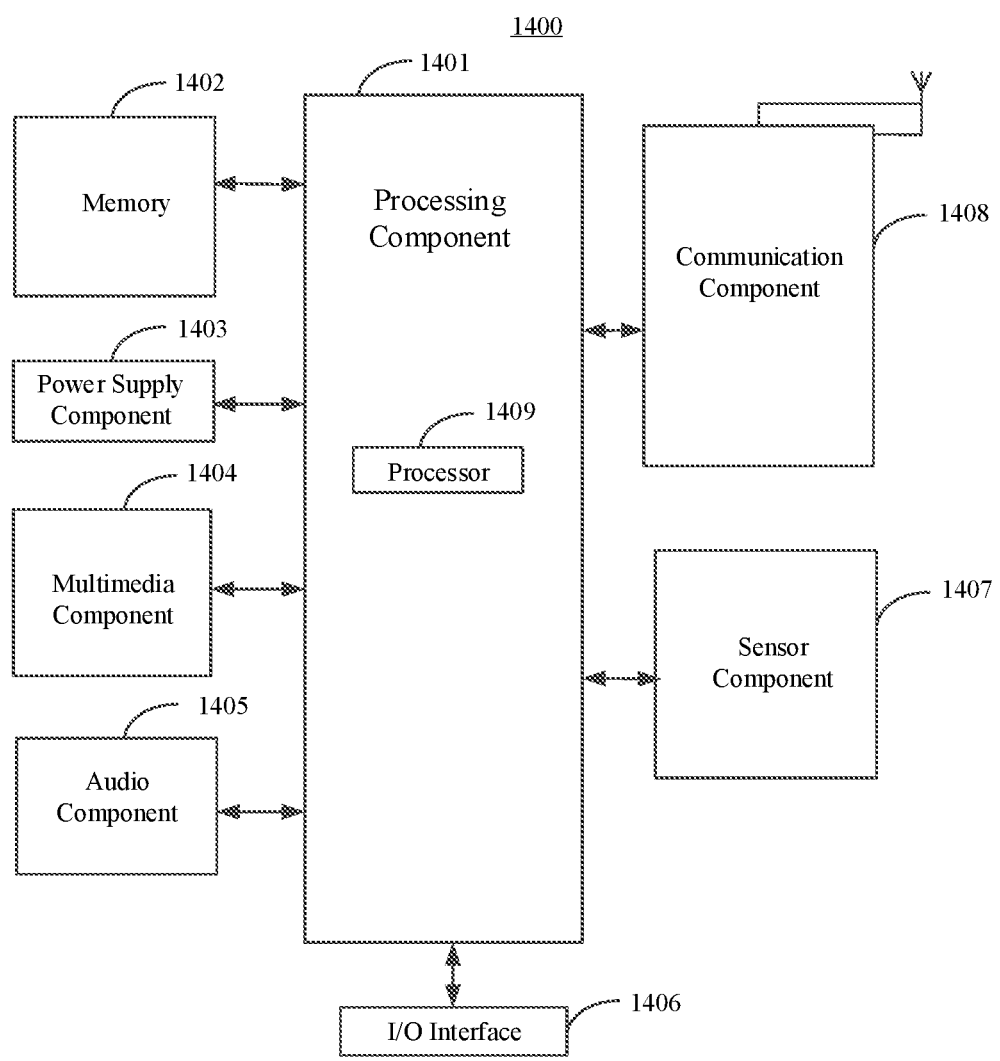
FIG. 14 is a structural diagram illustrating a UAV indication apparatus according to an example.

FIG. 14 is a structural diagram illustrating a UAV indication apparatus according to an example. As shown in FIG. 14, a UAV indication apparatus 1400 according to an example may be provided as a core network device, such as MME.

Referring to FIG. 14, the apparatus 1400 may include one or more of the following components: a processing component 1401, a memory 1402, a power component 1403, a multimedia component 1404, an audio component 1405, an input/output (I/O) interface 1406, a sensor component 1407, and a communication component 1408.

The processing component 1401 usually controls the overall operation of the apparatus 1400, such as operations associated with display, telephone calls, data communications, camera operations, and recording operations. The processing component 1401 may include one or more processors 1409 to execute instructions to perform all or part of the steps in the methods described above. Moreover, the processing component 1401 may include one or more modules to facilitate interaction between the processing component 1401 and other components. For example, the processing component 1401 may include a multimedia module to facilitate interaction between the multimedia component 1404 and the processing component 1401.

The memory 1402 is configured to store various types of data to support operation at the apparatus 1400. Examples of these data include instructions for any application or method operating at the apparatus 1400, contact data, phone book data, messages, pictures, videos, and the like. The memory 1402 may be implemented by any type of volatile or non-volatile storage device or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a disk or a compact disk.

The power component 1403 supplies power to various components of the apparatus 1400. The power component 1403 may include a power management system, one or more power sources, and other components associated with power generated, managed, and distributed for the apparatus 1400.

The multimedia component 1404 includes a screen that provides an output interface between the apparatus 1400 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1404 includes a front camera and/or a rear camera. When the apparatus 1400 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1405 is configured to output and/or input audio signals. For example, the audio component 1405 includes a microphone (MIC) configured to receive an external audio signal when the apparatus 1400 is in an operation mode, such as a call mode, a recording mode, and a voice recognition mode. The received audio signal may be further stored in the memory 1402 or transmitted via the communication component 1408. In some examples, the audio component 1405 also includes a loudspeaker for outputting an audio signal.

The I/O interface 1406 provides an interface between the processing component 1401 and a peripheral interface module which may be a keyboard, a click wheel, a button, or the like. These buttons may include, but are not limited to a home button, a volume button, a start button, and a lock button.

The sensor component 1407 includes one or more sensors for providing a status assessment in various aspects to the apparatus 1400. For example, the sensor component 1407 may detect an open/closed state of the apparatus 1400, and the relative positioning of components, for example, the component is a display and a keypad of the apparatus 1400. The sensor component 1407 may also detect a change in position of the apparatus 1400 or a component of the apparatus 1400, the presence or absence of a user in contact with the apparatus 1400, the orientation or acceleration/deceleration of the apparatus 1400 and a change in temperature of the apparatus 1400. The sensor component 1407 may include a proximity sensor configured to detect the presence of nearby objects without any physical contact. The sensor component 1407 may also include a light sensor, such as a CMOS or CCD image sensor, for use in imaging applications. In some examples, the sensor component 1407 may also include an acceleration sensor, a gyro sensor, a magnetic sensor, a pressure sensor, or a temperature sensor.

The communication component 1408 is configured to facilitate wired or wireless communication between the apparatus 1400 and other devices. The apparatus 1400 may access a wireless network based on a communication standard, such as Wi-Fi, 2G or 3G, or a combination thereof. In an example, the communication component 1408 receives broadcast signals or broadcast associated information from an external broadcast management system via a broadcast channel. In an example, the communication component 1408 also includes a Near Field Communication (NFC) module to facilitate short range communication. For example, the NFC module may be implemented based on a Radio Frequency Identification (RFID) technology, an Infrared Data Association (IrDA) technology, an Ultra-Wide Band (UWB) technology, a Bluetooth (BT) technology, and other technologies.

In an example, the apparatus 1400 may be implemented by one or more Application Specific Integrated Circuits (ASICs), Digital Signal Processors (DSPs), Digital Signal Processing Devices (DSPDs), Programmable Logic Devices (PLDs), a Field Programmable Gate Array (FPGA), a controller, a microcontroller, a microprocessor or other electronic elements for performing the above methods.

In an example, there is also provided a non-transitory computer-readable storage medium including instructions, such as a memory 1402 including instructions, where the instructions are executable by the processor 1409 of the apparatus 1400 to perform the method as described above. For example, the non-transitory computer-readable storage medium may be a ROM, a Random-Access Memory (RAM), a CD-ROM, a magnetic tape, a floppy disk, an optical data storage device, and the like.

When the instructions in the storage medium are executed by the processor, the apparatus 1400 can perform any of the UAV indication methods as described above.

Accordingly, the present disclosure also provides a UAV indication apparatus, the apparatus is applied to a base station, and includes:
a processor; and
a memory storing instructions executable by the processor,
where the processor is configured to:
receive first signaling from a core network device, where the first signaling includes a first SPID value for characterizing a UAV identity of a terminal transmitted an access request;
determine that the terminal is a UAV according to the first SPID value included in the first signaling; and
provide the terminal with a dedicated UAV service.

Figure 15:
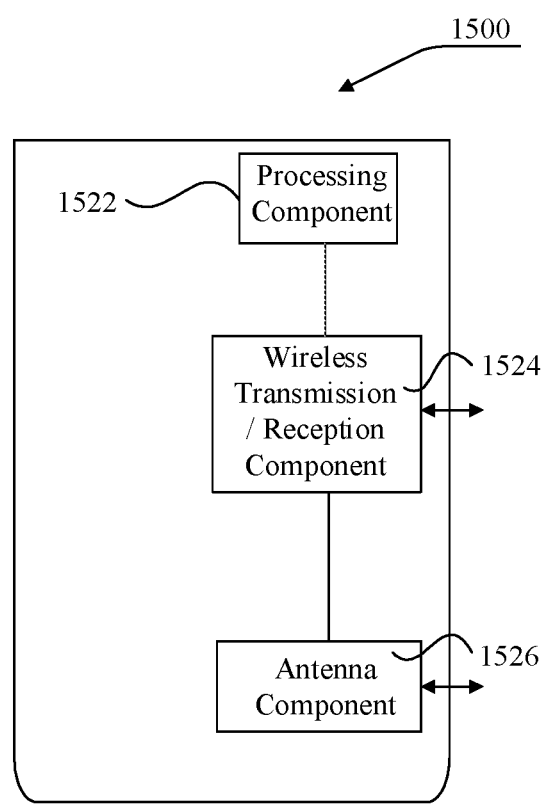
FIG. 15 is a structural diagram illustrating a UAV indication apparatus according to an example.

As shown in FIG. 15 which is a structural diagram illustrating a UAV indication apparatus according to an example, the apparatus 1500 may be provided as a base station. Referring to FIG. 15, the apparatus 1500 includes a processing component 1522, a wireless transmitting/receiving component 1524, an antenna component 1526, and a signal processing portion specific to a wireless interface. The processing component 1522 may further include one or more processors.

One of the processors in the processing component 1522 may be configured to perform any of the UAV indication methods as described above.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. An Unmanned Aerial Vehicle (UAV) indication method, being applied to a core network device, and comprising:
receiving an access request from a terminal;
adding a first Subscriber Profile ID (SPID) value to first signaling in response to determining that the terminal is a UAV according to the access request, wherein the first SPID value characterizes a UAV identity of the terminal, and the first signaling refers to initial context setup request signaling; and
transmitting the first signaling to a base station, such that the base station determines that the terminal is the UAV according to the first SPID value included in the first signaling and provides the terminal with a dedicated UAV service;
the method further comprising:
generating second signaling in response to determining that the terminal is not the UAV according to the access request, wherein the second signaling does not comprise the first SPID value; and
transmitting the second signaling to the base station, such that the base station determines that the terminal is not the UAV according to the first SPID value not included in the second signaling and adopts a common Long-Term Evolution (LTE) network service for the terminal.

2. The method according to claim 1, further comprising:
configuring the first SPID value, wherein the first SPID value specifically indicates the UAV identity of the terminal.

3. The method according to claim 1, wherein the access request comprises an International Mobile Equipment Identity (IMEI) for determining that the terminal is the UAV.

4. The method according to claim 1, wherein the second signaling comprises a second SPID value, the second SPID value characterizes a Radio Resource Management (RRM) strategy adopted for the terminal, and the second SPID value is different from the first SPID value.

5. An unmanned aerial vehicle (UAV) indication method, being applied to a base station, and comprising:
receiving first signaling from a core network device, wherein the first signaling comprises a first Subscriber Profile ID (SPID) value for characterizing a UAV identity of a terminal transmitted an access request, and the first signaling refers to initial context setup request signaling;
determining that the terminal is a UAV according to the first SPID value included in the first signaling; and
providing the terminal with a dedicated UAV service;
the method further comprising:
receiving second signaling from the core network device, wherein the second signaling does not comprise the first SPID value;
determining that the terminal is not the UAV according to the first SPID value not included in the second signaling; and
providing the terminal with a common Long-Term Evolution (LTE) network service.

6. The method according to claim 5, wherein the second signaling comprises a second SPID value, the second SPID value characterizes a Radio Resource Management (RRM) strategy adopted for the terminal, and the second SPID value is different from the first SPID value; and
providing the terminal with the common LTE network service comprises:
adopting the RRM strategy corresponding to the second SPID value for the terminal.

7. A core network device, comprising:
a processor; and
memory storing instructions executable by the processor, wherein the processor is configured to:
receive an access request from a terminal;
add a first Subscriber Profile ID (SPID) value to first signaling in response to determining that the terminal is an unmanned aerial vehicle (UAV) according to the access request, wherein the first SPID value characterizes a UAV identity of the terminal, and the first signaling refers to initial context setup request signaling; and transmit the first signaling to a base station, such that the base station determines that the terminal is the UAV according to the first SPID value included in the first signaling and provides the terminal with a dedicated UAV service;

wherein the processor is further configured to:

generate second signaling in response to determining that the terminal is not the UAV according to the access request, wherein the second signaling does not comprise the first SPID value; and transmit the second signaling to the base station, such that the base station determines that the terminal is not the UAV according to the first SPID value not included in the second signaling and adopts a common LTE network service for the terminal.

8. A base station implementing the method of claim 5, comprising:

a processor; and memory storing instructions executable by the processor, wherein the processor is configured to execute steps of the method.

9. The core network device according to claim 7, wherein the processor is further configured to:

configure the first SPID value, wherein the first SPID value specifically indicates the UAV identity of the terminal.

10. The core network device according to claim 7, wherein the access request comprises an International Mobile Equipment Identity (IMEI) for determining that the terminal is the UAV.

11. The core network device according to claim 7, wherein the second signaling comprises a second SPID value, the second SPID value characterizes a Radio Resource Management (RRM) strategy adopted for the terminal, and the second SPID value is different from the first SPID value.

12. The base station according to claim 8, wherein the second signaling comprises a second SPID value, the second SPID value characterizes a Radio Resource Management (RRM) strategy adopted for the terminal, and the second SPID value is different from the first SPID value; and the providing the terminal with the common LTE network service comprises:

adopting the RRM strategy corresponding to the second SPID value for the terminal.

13. A communication system implementing the method of claim 1, comprising the core network device, the terminal, and the base station, wherein the core network device is configured to inform the base station whether the terminal is a UAV through the first signaling, thereby saving signaling overheads and improving efficiency for providing UAV service; and the base station is configured to, upon receiving the first signaling including the first SPID value from the core network device, determine that the terminal transmitted the access request is the UAV according to the first SPID value included in the first signaling, and provide the terminal with the dedicated UAV service.

* * * * *